3,306,882
WAX-RESIN COMPOSITIONS
Edward A. Pullen, Fullerton, and Irving D. Webb, Yorba Linda, Calif., assignors to Union Oil Company of California, Los Angeles, Calif., a corporation of California
No Drawing. Filed Nov. 12, 1963, Ser. No. 323,133
8 Claims. (Cl. 260—28.5)

This invention relates to compositions of matter comprising wax and synthetic resins, and in particular concerns compositions essentially comprising microcrystalline or paraffin wax, copolymers of ethylene and vinyl acetate, and copolymers of alpha-methyl styrene and vinyl toluene. Such compositions are useful for coating and impregnating flexible sheet material, such as paper, cardboard, regenerated cellulose, etc., to render the same exceptionally impervious to moisture and moisture vapor.

The use of compositions comprising microcrystalline or paraffin wax and copolymers of ethylene and vinyl acetate as moisture vapor-proofing agents for various sheet materials has been described in U.S. Patent No. 2,877,196. Such compositions comprise 80–99.9 weight percent of the wax and 0.1–20 weight percent of the copolymer, and the latter consists of 5–25 weight percent of vinyl acetate and 75–95 weight percent of ethylene. Compositions having similar properties, and consisting of 1–30 weight percent of wax, 15–50 weight percent of copolymer (containing 1–10 mols of ethylene per mol of vinyl acetate), and 30–80 weight percent of a hard brittle resin such as modified phenol-formaldehyde, are described in U.S. Patent No. 2,490,550. However, the compositions described in the first of these patents do not have sufficient moisture vapor-proofing properties to satisfy the heavy duty requirements of frozen food packaging, whereas those of the second patent are unduly expensive in that they contain at least 70 weight percent of costly synthetic resins, and are difficult to apply as coating without the use of a solvent.

It is accordingly an object of the present invention to provide moisture vapor-proofing compositions which contain a high proportion of relatively inexpensive petroleum wax, which have superior moisture vapor-proofing properties, and which can readily be applied to various sheet materials without the use of a solvent. A further object is to provide sheet material coated with such compositions and especially adapted to use in forming containers for frozen foods and the like which are subjected to high humidity conditions over long periods of time. Other objects will become apparent as the description of the invention proceeds.

The invention is based on the discovery that the foregoing objects and attendant advantages can be attained by the preparation and use of compositions of the following formulation:

| | Percent by weight |
|---|---|
| Petroleum wax | 50–80 |
| Copolymer of ethylene and vinyl acetate | 15–40 |
| Copolymer of alpha-methyl styrene and vinyl toluene | 2–10 |

Preferred formulations comprise 60–70 weight percent of the wax, 25–35 weight percent of the first copolymer, and 2–8 weight percent of the second copolymer. In addition, the composition may contain minor amounts of antioxidants, slipping agents, and other additives conventionally employed in compositions of this type to impart special properties thereto.

The wax component of the present compositions is of petroleum origin and may be amorphous, microcrystalline or crystalline in character. Paraffin waxes are preferred, particularly those having melting points or melting ranges between about 120° F. and about 180° F. A paraffin wax derived from California petroleum and melting at 143°–150° F. (sold by Union Oil Company of California under the name "Aristowax 143/150") is particularly preferred.

The copolymer of ethylene and vinyl acetate is one containing from about 5 to about 75 weight percent of vinyl acetate and from about 25 to about 95 weight percent of ethylene. Those containing from about 18 to about 35 weight percent of vinyl acetate and from about 65 to about 72 weight percent of ethylene are preferred. The molecular weight may vary over wide limits, e.g., from as low as 2000 to 100,000 or higher, but is preferably that the polymer has a melt index of about 20–30. Suitable copolymers are available commercially under a variety of names, e.g., "Elvax" (Du Pont), "A-C 400" (Allied Chemical Co.), etc.

The copolymer of alpha-methyl styrene and vinyl toluene may be any of those described in U.S. Patent No. 3,000,868 as containing 25–35 weight percent of alpha-methyl styrene and 65–75 weight percent of vinyl toluene, and having a softening point (ball and ring method) of 100°–130° C. Such copolymers are available from Pennsylvania Industrial Chemical Corporation under the name "Piccotex."

As previously stated, the present compositions may also contain minor amounts of conventional modifying agents. When the composition is to be employed to coat food board (i.e., lightweight cardboard used in forming food containers such as ice cream cartons, butter cartons, frozen meat and vegetable cartons), it preferably contains 0.01–0.1 weight percent of an antioxidant such as butylated hydroxytoluene or butylated hydroxyanisole. Similarly, for ease in handling such coated board, the composition preferably contains 0.1 to 1.0 weight percent of an anti-slipping agent such as oleylamide.

The present compositions are prepared simply by mechanically mixing the components, preferably in molten form. If desired, they may be mixed in solution, although one of the advantages of the present compositions resides in the fact that they may be prepared and applied as coatings without the use of a solvent or dispersing medium. A preferred procedure consists in charging the wax to an oil-jacketed kettle provided with an efficient stirring device. The wax is heated to 290°–390° F., after which the copolymer of ethylene and vinyl acetate is added in relatively small increments. When a uniform mixture is attained, the mixture is cooled to about 225°–275° F., and the copolymer of alpha-methyl styrene and vinyl toluene is added. Stirring is continued until a homogeneous composition is obtained, after which it is cooled and packaged for storage and shipment. When an antioxidant is employed, it is added to the initial wax charge at a relatively low temperature.

The following examples are illustrative of the compositions of the invention, but are not to be construed as limiting the same:

*Example I*

| | Percent by wt. |
|---|---|
| Paraffin wax, M.P.=143°–150° F. | 64.2 |
| Copolymer of ethylene and vinyl acetate | 30.0 |
| Copolymer of alpha-methyl styrene and vinyl toluene | 5.0 |
| Butylated hydroxytoluene | 0.05 |
| Oleylamide | 0.75 | position, in hot melt form, to 14-point food board at a nominal top side weight of about 5 lbs./ream. The board samples so prepared were subjected to the standard TAPPI "Water Vapor Permeability of Sheet Materials at High Temperature and Humidity" test (TAPPI Method T–464 m–45) which is carried out at 100° F. and 90% relative humidity for 30 days. Certain of the samples were also subjected to a modification of this test carried out at 0° F. and 100% relative humidity for 30 days.

The water vapor permeability is expressed in grams of water/square meter/24 hours.

| Comp. No. | Composition [1][2] | | | | | | Coating Wt. | | Permeability at 100° F. | | Permeability at 0° F. | |
|---|---|---|---|---|---|---|---|---|---|---|---|---|
| | Wax[3] | Elvax 220 | Elvax 250 | Elvax 260 | Piccotex S120 | Poly-ethylene[4] | Top Side | Total | Flat | Scored and Bent | Flat | Scored and Bent |
| 1 | 64.2 | 15.0 | 15.0 | | 5.0 | | 6.3 | 7.6 | 0.26 | 0.28 | 0.16 | |
| 2 | 74.2 | | | 20.0 | 5.0 | | 5.3 | 6.7 | 0.24 | 0.28 | | |
| 3 | 69.2 | | | 20.0 | 10.0 | | 5.0 | 5.7 | 0.18 | 0.17 | | |
| 4 | 64.2 | 17.5 | 17.5 | | | | 6.0 | 8.0 | 2.15 | 2.30 | 0.98 | 1.70 |
| 5 | 64.2 | 15.0 | 15.0 | | | 5.0 | 6.0 | 8.3 | 2.26 | 2.36 | 0.94 | 1.63 |

[1] All proportions given in percent by weight.
[2] All compositions contained 0.75 wt. percent of oleylamide and 0.05 wt. percent of butylated hydroxytoluene.
[3] "Aristowax 143/150."
[4] Molecular Wt.=ca. 2,000.

*Example II*

| | Percent by wt. |
|---|---|
| Paraffin wax, M.P.=165° F. | 64.2 |
| Elvax 220 [1] | 15.0 |
| Elvax 250 [2] | 15.0 |
| Piccotex 120 [3] | 5.0 |
| Butylated hydroxytoluene | 0.05 |
| Oleylamide | 0.75 |

[1] Copolymer of ethylene and vinyl acetate; 28% vinyl acetate, 72% ethylene.
[2] Copolymer of ethylene and vinyl acetate; 28% vinyl acetate, 82% ethylene; higher molecular weight than (1), melt index=15.
[3] Copolymer of alpha-methyl styrene and vinyl toluene; softening point=120° C.

*Example III*

| | |
|---|---|
| Microcrystalline wax | 52.0 |
| Elvax 150 [1] | 37.0 |
| Piccotex 120 | 11.0 |

[1] Copolymer of ethylene and vinyl acetate; 33% vinyl acetate, 67% ethylene; melt index=25.

*Example IV*

| | |
|---|---|
| Paraffin wax, M.P.=130°–134° F. | 78.0 |
| Elvax 240 [1] | 20.0 |
| Piccotex 100 [2] | 2.0 |
| Butylated hydroxyamide | 0.05 |

[1] Copolymer of ethylene and vinyl acetate; 28% vinyl acetate, 72% ethylene; melt index=25.
[2] Copolymer of alpha-methyl styrene and vinyl toluene; softening point=100° C.

*Example V*

| | |
|---|---|
| Paraffin wax, M.P.=143°–150° F. | 69.2 |
| Elvax 260 [1] | 20.0 |
| Piccotex 120 | 10.0 |
| Oleylamide | 0.75 |
| Butylated hydroxytoluene | 0.05 |

[1] Copolymer of ethylene and vinyl acetate; 28% vinyl acetate, 72% ethylene.

As previously stated, the present compositions have exceptional properties as moisture vapor-proofing agents for fibrous sheet materials such as paper, cardboard, carton stock, corrugated board, etc. While they may be employed as impregnants, they are more usually applied as coatings by any of the conventional procedures. Their relatively low viscosities at moderate temperatures permit them to be applied in the molten state (i.e., as hot melt coatings), but if desired they may be employed in solution form.

Tabulated below are data illustrating the superior moisture vapor-proofing properties of the present compositions. These data were obtained by applying the indicated composition, in hot melt form, to 14-point food board at a Other modes of applying the principle of our invention may be employed instead of those explained, change being made as regards the methods or materials employed provided the compositions or articles defined by any of the appended claims, or the equivalent of such defined compositions or articles, be obtained.

We, therefore, particularly point out and distinctly claim as our invention:

1. A composition of matter essentially comprising: (a) between about 50 and about 80 percent by weight of a petroleum wax, (b) between about 15 and about 40 percent by weight of a copolymer of ethylene and vinyl acetate containing between about 5 and about 75 percent by weight of vinyl acetate and between about 25 and about 95 percent by weight of ethylene, and (c) between about 2 and about 10 percent by weight of a copolymer of alpha-methyl styrene and vinyl toluene containing between about 25 and about 35 percent by weight of alpha-methyl styrene and between about 65 and about 75 percent by weight of vinyl toluene.

2. A composition as defined by claim 1 essentially comprising between about 60 and about 70 percent by weight of said wax, between about 25 and about 35 percent by weight of said copolymer of ethylene and vinyl acetate, and between about 2 and about 8 percent by weight of said copolymer of alpha-methyl styrene and vinyl toluene.

3. A composition as defined by claim 1 wherein said copolymer of ethylene and vinyl acetate contains between about 18 and about 35 percent by weight of vinyl acetate and between about 65 and about 72 percent by weight of ethylene, and said copolymer of alpha-methyl styrene and vinyl toluene has a softening point of about 120° C.

4. A composition as defined by claim 1 containing between about 0.01 and about 0.1 percent by weight of an anti-oxidant.

5. A composition of matter essentially comprising: (a) between about 60 and about 70 percent by weight of a microcrystalline wax melting between about 143° and about 150° F., (b) between about 25 and about 35 percent by weight of a copolymer of ethylene and vinyl acetate containing between about 18 and about 35 percent by weight of vinyl acetate and between about 65 and about 72 percent by weight of ethylene, (c) between about 2 and about 8 percent by weight of a copolymer of alpha-methyl styrene and vinyl toluene containing between about 25 and about 35 percent by weight of alpha-methyl styrene and between about 65 and about 75 percent by weight of vinyl toluene and having a softening point of about 120° C., (d) between about 0.01 and about 0.1 percent by weight of butylated hydroxytoluene, and
(e) between about 0.1 and about 1.0 percent by weight of oleylamide.

6. An article of manufacture comprising a fibrous sheet material coated with a composition as defined by claim 1.

7. An article of manufacture comprising a fibrous sheet material coated with a composition as defined by claim 2.

8. An article of manufacture comprising a fibrous sheet material coated with a composition as defined by claim 5.

No references cited.

MORRIS LIEBMAN, *Primary Examiner.*

J. FROME, *Assistant Examiner.*